United States Patent
Mueller et al.

(10) Patent No.: US 7,204,520 B2
(45) Date of Patent: Apr. 17, 2007

(54) DEVICE FOR JOINING COMPONENTS MADE OF FUSIBLE PLASTIC

(75) Inventors: Gerhard Mueller, Mannheim (DE); Wolfgang Sichler, Mannheim (DE); Fabian Maier, Westheim (DE)

(73) Assignee: Friatec Aktiengesellschaft, Mannheim (DE)

(*) Notice: Subject to any disclaimer, the term of this patent is extended or adjusted under 35 U.S.C. 154(b) by 0 days.

(21) Appl. No.: 10/357,518

(22) Filed: Feb. 4, 2003

(65) Prior Publication Data

US 2003/0168853 A1 Sep. 11, 2003

Related U.S. Application Data

(63) Continuation of application No. PCT/EP01/09052, filed on Aug. 3, 2001.

(30) Foreign Application Priority Data

Aug. 4, 2000 (DE) .......................... 200 13 596 U (51) Int. Cl.
  *F16L 13/02* (2006.01)
  *B29C 65/02* (2006.01)
(52) U.S. Cl. .................. 285/21.1; 285/294.1; 285/39; 156/304.2; 156/380.2; 219/546; 219/548
(58) Field of Classification Search ............. 285/21.1, 285/21.2, 285.1, 293.1, 294.1, 287, 39; 156/304.1, 156/304.2, 380.2, 380.6; 219/535, 544, 545, 219/546, 548
See application file for complete search history.

(56) References Cited

U.S. PATENT DOCUMENTS

| 2,992,457 A | * | 7/1961 | Harrison ..................... 264/230 |
| 3,061,503 A | * | 10/1962 | Gould et al. ............. 156/274.2 |
| 3,455,017 A | * | 7/1969 | Zondag ....................... 228/108 |
| 3,506,519 A | * | 4/1970 | Blumenkranz ........... 156/274.2 |
| 3,907,625 A | * | 9/1975 | Vogelsanger ................ 156/253 |
| 4,090,899 A | * | 5/1978 | Reich ........................... 156/79 |
| 4,117,859 A | * | 10/1978 | Illy ............................. 137/219 |
| 4,176,274 A | * | 11/1979 | Lippera ...................... 219/522 |

(Continued)

FOREIGN PATENT DOCUMENTS

DE        8522203        8/1985

(Continued)

OTHER PUBLICATIONS

International Search Report Dec. 3, 2001.

(Continued)

*Primary Examiner*—James M. Hewitt
(74) *Attorney, Agent, or Firm*—Crowell & Morning LLP (57) ABSTRACT

A device for connecting components (1, 2, 3) made of fusible plastic, especially pipes (12, 60) of a fuel pipeline or a fuel line to a fuel tank (8) of a vehicle. The device includes a heating element (4) having ends (44, 46) which are used to supply electrical energy. The device is easy to use, simple to mount, and produces a functionally reliable welded joint between the components (1, 2, 3). To achieve this, one component (3) includes a retaining body (16) for a retaining tool (50), and the two ends (44, 46) of the heating element (4) extend onto the retaining body (16) where they can engage contact elements (56, 57) on the retaining tool (50).

13 Claims, 9 Drawing Sheets

U.S. PATENT DOCUMENTS

| | | | |
|---|---|---|---|
| 4,508,368 A * | 4/1985 | Blumenkranz | 285/21.2 |
| 4,553,021 A | 11/1985 | Conti | |
| 4,770,442 A * | 9/1988 | Sichler | 285/21.2 |
| 4,865,674 A * | 9/1989 | Durkin | 156/158 |
| 5,104,468 A * | 4/1992 | de Jong | 156/166 |
| 5,125,690 A * | 6/1992 | Taylor et al. | 285/21.2 |
| 5,176,410 A * | 1/1993 | Beyer | 285/187 |
| 5,443,098 A * | 8/1995 | Kertesz | 138/109 |
| 5,752,725 A * | 5/1998 | El-Sobky | 285/21.1 |

FOREIGN PATENT DOCUMENTS

| | | |
|---|---|---|
| DE | 3422074 A1 | 1/1986 |
| DE | 3718236 A1 | 12/1988 |
| DE | 4342302 C1 | 1/1995 |
| DE | 19907736 A1 | 2/2000 |
| EP | 838 325 A2 | 4/1998 |
| EP | 0838325 | 4/1998 |
| EP | 919 761 A1 | 6/1999 |
| JP | 10-246382 | 9/1988 |
| JP | 3-112329 | 11/1991 |
| JP | 08-224784 | 9/1996 |
| JP | 08-277988 | 10/1996 |
| JP | 10-220676 | 8/1998 |
| JP | 10-246381 | 9/1998 |
| JP | 11-254539 | 9/1999 |
| SU | 1174282 | 8/1985 |
| SU | 1666342 | 7/1991 |
| SU | 828559 | 9/1991 |
| SU | 1684083 | 10/1991 |
| WO | WO 93/22127 | 11/1993 |
| WO | WO 02/11973 | 2/2002 |

OTHER PUBLICATIONS

Japanese Office Action dated Nov. 24, 2005.
European Opposition dated Feb. 6, 2006.

* cited by examiner

DEVICE FOR JOINING COMPONENTS MADE OF FUSIBLE PLASTIC

CROSS REFERENCE TO RELATED APPLICATIONS

This application is a continuation of international patent application no. PCT/EP01/09052, filed Aug. 3, 2001, designating the United States of America, and published in German as WO 02/11973, the entire disclosure of which is incorporated herein by reference. Priority is claimed based on Federal Republic of German patent application no. DE 200 13,596.1, filed Aug. 4, 2000.

BACKGROUND OF THE INVENTION

The invention relates to a device for connecting components made of fusible plastic, particularly pipes of a fuel line, or for connecting a fuel line with a fuel tank of a vehicle.

European patent application no. EP 919,761 discloses a device of this type which comprises a sleeve body for connecting two pipe ends. In the inside surface of the substantially hollow cylindrical sleeve body a heating element is arranged, which is configured as a heating coil made of resistance wire and to which a current or electric energy can be applied. The wire ends of the heating element configured as a heating coil extend to the exterior into sockets. With corresponding contacts of connecting lines, the electrical connection with a welding device can be established to supply the heating element with current and thereby to heat the plastic so that an electric weld is produced.

Such electric welding sleeves have been used very successfully to connect pipes in supply networks, e.g., water pipes or gas pipes. However, the personnel must be experienced in handling the welding device and producing the electric weld, and the welding operation has to be carefully prepared and executed. Also, the production of such welding sleeves, particularly with respect to the contacting of the wire ends in said sockets is quite complex. To prepare and execute the electric welding operation, various actions must be performed manually, which involves a considerable amount of time and assembly.

Especially in automotive fuel tank systems with a plastic fuel tank and a plastic fuel line that is to be connected therewith, the current joining techniques consist of using hose connecting clamps or butt-welding of the connecting points with heat reflectors. The drawback is that there is no adequate diffusion barrier and complex assembly is required during production, especially since a variety of different components are required. Also, any repair or replacement of individual components requires a substantial amount of time.

In addition, there is the problem of positioning add-on devices, e.g., fuel pump, hose holder, sensors, etc. in and on the tank. The currently used butt-welding process with heat reflectors is difficult, especially in the interior of the tank and/or on surfaces that are not flat. It should moreover be noted that for diffusion reasons, all additional openings on the fuel tank should be avoided, so that the positioning of additional devices in areas of the tank that are remote and/or difficult to access requires a significant amount of time and is often not possible without an auxiliary opening.

When add-on devices or other parts are butt-welded with heat reflectors in the interior of the tank, a heat reflector is brought to the welding position through the existing tank opening, i.e., the opening for the tank fitting, by means of a complex telescope mechanism in order to melt the tank wall at that point. Since the additional device cannot be carried along directly for lack of space, the heat reflector must first be withdrawn and the additional device must then be brought to the desired position. Since a properly welded joint requires a predefined welding temperature and contact pressure, process control is very difficult and costly.

SUMMARY OF THE INVENTION

Accordingly, it is an object of the invention to provide a device for connecting fusible plastic components that ensures a functionally reliable welded connection of the components by simple means.

It is also an object of the invention to provide a device for connecting fusible plastic components which enables connections to be made at low cost.

Another object of the invention is to provide a device for connecting fusible plastic components with which preparation and production of the connection requires only a little fabrication and assembly time.

A still further object of the invention is to provide a device for connecting fusible plastic components which facilitates automated production of the connection so that the production of the connection can be automated at least to a large extent.

Yet another object of the invention is to provide a device for connecting fusible plastic components which enables connections to be produced in an automated production plant.

These and other objects are achieved in accordance with the present invention by providing a device for connecting components made of fusible plastic, wherein the device comprises a component with a heating element having ends through which electrical energy can be supplied, wherein the component containing the heating element further comprises a holding element for engaging a holding tool, and the ends of the heating element extend to the holding element and engage contacts on the holding tool when the holding tool is applied to the holding element.

The proposed device is distinguished by its simple construction and makes it possible to produce the welded joint at low cost. The component containing the heating element is provided with a holding element which carries the particularly planar heating-element ends serving for electrical connection and which is configured for the component to be held by a holding tool. Sockets or the like to produce the connection with a welding device are not required, since contact is established via the holding element and the holding tool.

The holding tool is preferably constructed as a clamp for receiving the components in preparation for the welding procedure, and during welding ensures the electric connection with the heating element through suitable contacts. The component is preferably sleeve-like and on an outer surface as well as on an inner surface contains the heating element or parts thereof. It is inserted into an annular gap between the components to be joined, one of which is configured as a sleeve and the other as a pipe end.

Within the scope of the invention, the sleeve can be part of a tank or a pipe for putting fuel into a motor vehicle. This sleeve is configured as an annular section which is pulled inwardly in the area of the tank opening and which is preferably an integral part of the tank. This has the significant advantage that the connection satisfies all the requirements and specifications associated with automotive technology, particularly fuel permeability relative to the environment. An improved diffusion seal and a longitudinal interference fit between the refueling pipe and the fuel tank are ensured with a high degree of functional reliability.

In an alternative embodiment, the component provided with the heating element can be configured to receive and position add-on devices, e.g., a fuel pump, hose holders, sensors, etc., on the fuel tank. In automotive technology, the proposed device provides the substantial advantage that the device and/or connection satisfy all the requirements and specifications and, in particular, reduce fuel permeability relative to the environment. In the embodiment with a fuel tank, the tank comprises the sleeve-like component in the area of the tank opening for the fitting. This sleeve-like component is configured as an annular section or sleeve that is pulled into the interior of the tank, into which the plastic refueling pipe is inserted while forming a circumferential annular gap. The component configured as the welding sleeve and containing the heating element is inserted into this annular gap.

In the embodiment for connecting two pipes, particularly of an automotive fuel line, the one pipe end is configured as a sleeve into which the pipe to be connected can be inserted while forming an annular gap. The component configured as the welding sleeve and provided with the heating element is again inserted into this gap. Furthermore, the component provided with the heating element can comprise this heating element in the area of an end surface or an annular surface. The surface contour can be flat, concave, convex, etc. to correspond with the surface contour of the other component. Additional pressure means are used to generate and/or maintain the required contact pressure during the welding operation, particularly between the latter component and the other component, especially the wall of a fuel tank.

The holding element of the component that contains the heating element is advantageously configured as a segment or flange such that the aforementioned holding tool can engage therewith and establish the electrical contact or the electrical connection with the heating element. The contacts of the heating element are preferably arranged opposite one another so that the electrical connection with the heating element is established when the holding tool engages and/or presses against and/or holds said component.

The heating element advantageously comprises a wire and/or is configured as a winding. Furthermore, the heating element or the electrical conductor or conductors can be applied to the welding surface of said component and, in particular, can be an electrically conductive vapordeposited material, or a metal grid, or electrically conductive carbon fibers, or electrically conductive plastic or polymers. The welding energy is supplied through the heating element using electric resistance heating or induction or microwave technology.

Irrespective of the corresponding configuration and the concrete embodiment of the heating element, it is important within the scope of the invention that the electrical connections and/or the wire ends or the like extend to the holding element such that the electrical connection to a welding device, which provides the voltage and/or the current required for the welding operation, is established by the holding tool, particularly by the contacts arranged in the holding tool.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
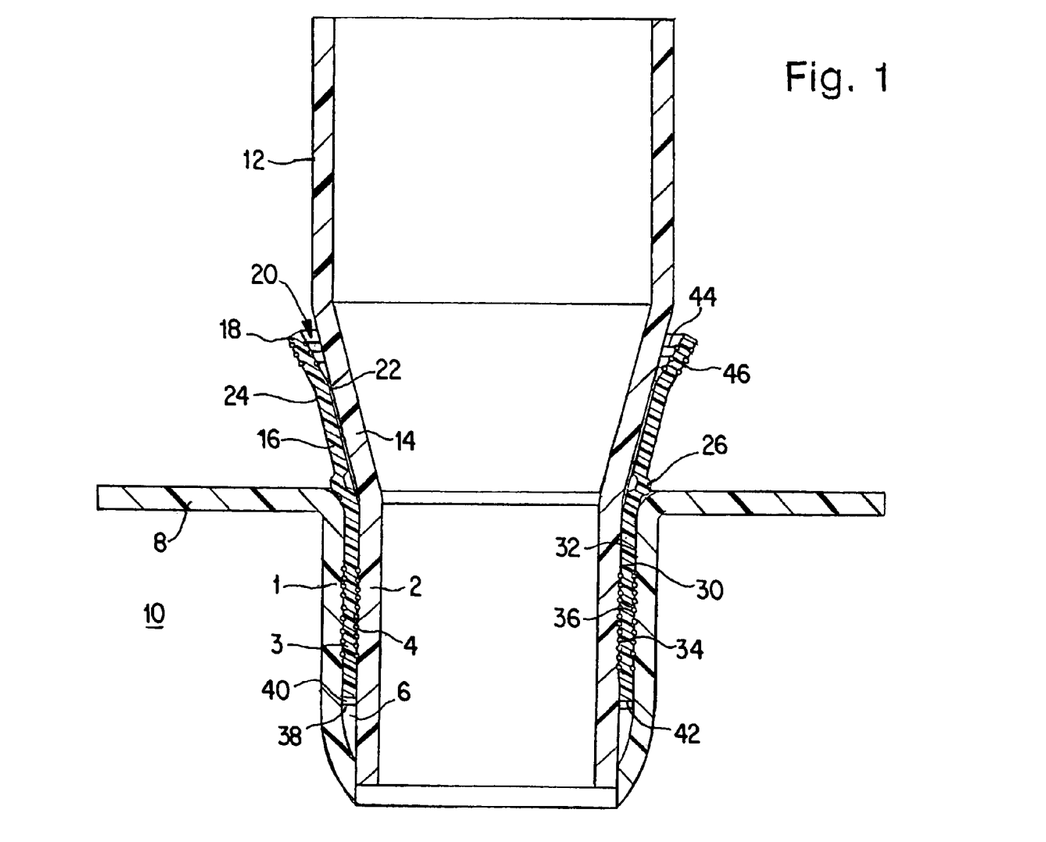
FIG. 1 is a partial longitudinal section through a fuel tank and the refueling pipe connected therewith by a welding sleeve.

FIG. 1 is a longitudinal section through a first component 1, a second component 2 and an additional component 3 that comprises a heating element 4 for connecting the first and second components 1, 2. The first component 1 is configured as a sleeve that surrounds the second component while forming an annular gap 6 that receives the additional component 3. The first component 1 forms part of a tank 8, which is only partially shown here. It extends into the interior 10 of the tank and is configured as an annular section that is pulled inwardly in the area of the tank opening.

The second component 2 is part of a pipe 12, which is also only partially shown here and is used to fill the tank 8 with fuel. These components 1, 2 and 3 are made of a fusible and/or thermoplastic material, particularly polyethylene (PE). The second component 2 or pipe 12 comprises a conical section 14 that is located outside the tank 8 and forms a taper of pipe 12 toward the interior 10.

The additional component 3 comprises a collar or flange 16, also located outside the tank, in such a way that at least in the area of its free end 18 a clearance 20 is formed. Flange 16 and/or its free end 18 is configured as a holding element for a holding tool (not shown), which can engage on the one hand with the inner surface 22 of clearance 20 and on the other hand with the outer surface 24 of holding element 16 to grasp and hold the latter. The holding element 16 as depicted is advantageously closed along its circumference. Within the scope of the invention, however, at least its free end 18 can also be configured as a segment that extends over only a portion of the circumference.

The additional component 3, hereinafter also referred to as a welding sleeve, further comprises a limit stop 26, which ensures a defined insertion depth in the first sleeve-like component 1. The conical or tapered configuration of section 14, where the cone angle advantageously corresponds to that of the flange of holding element 16, determines a defined insertion depth in tank 8 for pipe 12. The limit stop 26 may be annularly closed along the circumference or may consist of a plurality of radially outwardly facing projections.

The additional component or welding sleeve 3, in the area of annular gap 6, is provided with a heating element 4, which is disposed on both the inner surface 30 and the outer surface 32 of the welding sleeve 3. The heating element 4 on the inner surface 30 has an inner heating coil 34 and on the outer surface 32 an outer heating coil 36 made of an electrically conductive wire and/or resistance wire.

The heating coils 34, 36 are interconnected at the end face 38 of the welding sleeve 3 by a wire part 40. This wire part 40 is advantageously disposed in a recess 42 of end face 38 and is thus protected against external influences. Advantageously, the end face 38 comprises a plurality of such radially extending recesses 42, so that during manufacture of heating element 4, which consists of a single continuous heating wire, wire part 40 can easily be inserted into one of these recesses 42.

According to the invention, the ends of heating element 4 or the free wire ends 44, 46 of the two heating coils 34 and 36 are lead to the holding element 16 and/or its free end 18, i.e., along the inner surface and along the outer surface thereof. It is particularly important that the wire ends and/or contacts 44, 46 of the heating element 4 are opposite one another. Preferably, the contacts are arranged and/or configured to be planar. The ends 44, 46 thus form a first and a second planar contact for heating element 4.

The ends 44, 46 advantageously extend over the entire circumferential area of holding element 16 or, if the holding element is configured in segments, over a predefined circumferential angle. Thus, the aforementioned holding tool can engage with the holding element 16 over a predefined circumferential angle, advantageously over the full circumferential angle of 360°, to establish the electrical connection with heating element 4. The holding tool has additional contacts that correspond with the ends or contacts 44, 46 of heating element 4 to ensure the electrical connection and contacting of heating element 4 when the holding element 16 is grasped.

In preparation for producing the welded joint, the additional component 3 is inserted into the first sleeve-like component 1, with limit stop 26 defining the insertion depth. Thereafter, the second component 2 is inserted into the additional component 3, with the conical section 14 on the correspondingly conical flange or holding element 16 likewise defining the insertion depth. Alternatively, the additional component 3 can first be pushed onto the second component 2, and the second component 2 and the additional component 3 can then be inserted into the first sleeve-like component 1. It should be noted here that the inside and outside diameters of the adjacent surfaces of these components are adjusted in such a way as to ensure direct contact to a large extent between the associated component surfaces, so that the necessary contact pressure can be produced during the welding operation to ensure a complete and tight electric weld without gaps over the circumference and in axial direction.

As will be explained below, the holding tool, in a special embodiment of the invention, can be initially used to grasp the additional component or welding sleeve 3 by the flange 16 and/or its free ends 18, e.g., to take it out of a supply box. By means of the holding tool the additional component 3 is then inserted into the first component 1 or the tank opening configured according to the invention. Thereafter, pipe 12 with the second component 2 is inserted into the interior of the additional component 3, while the holding tool remains engaged with the holding element 16.

The welding device, which is electrically connected with the holding tool, is preferably furthermore configured in such a way that proper contact and/or the required configuration of heating element 4 can be verified, so that incorrect contact and/or faulty additional components 3 can be detected and can advantageously be exchanged prior to the welding operation so that faulty joints are reliably avoided.

Figure 2:
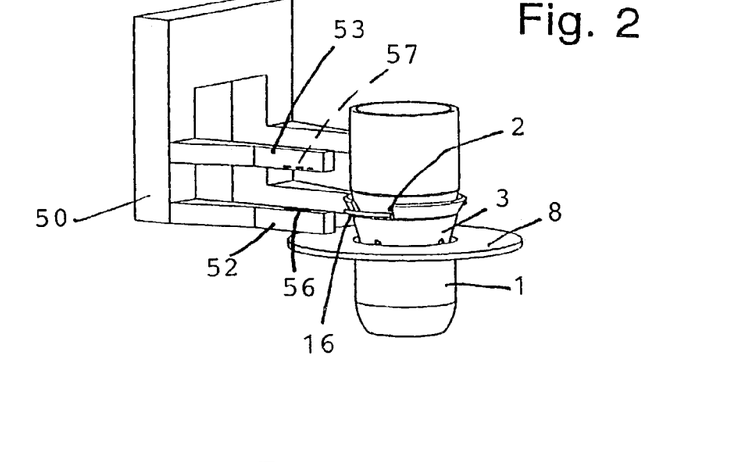
FIGS. 2–4 are schematic representations illustrating the production of a welded joint.
Figure 3:
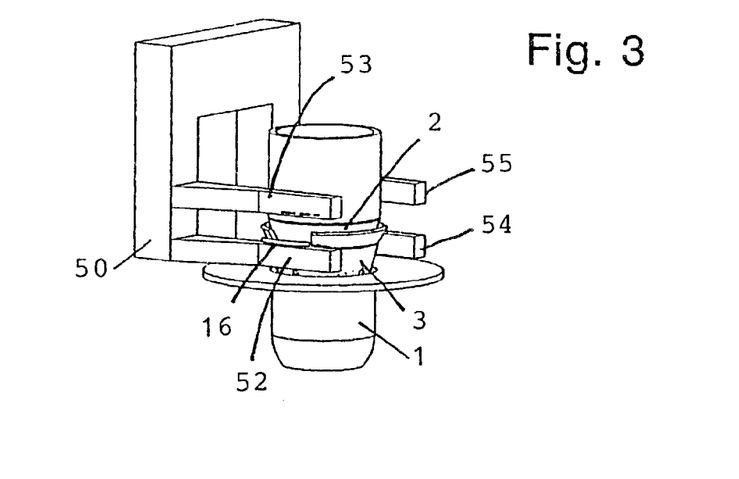

The procedure for producing the electric weld will now be explained in greater detail with reference to FIGS. 2 to 4. According to FIG. 2, the three components 1, 2 and 3 are inserted into one another in the manner described above. The welding sleeve 3 is provided with holding element 16, which in this case is segmented. Holding tool 50 comprises two clamp-like jaws 52, 53, between which the holding element 16 can be positioned in the holding tool 50 while components 1, 2, 3 are inserted, as shown in FIG. 3. The holding tool 50 has at least one additional jaw 54, 55, which is/are spaced at predefined distance(s) from the two aforementioned jaws 52, 53. These distances substantially correspond to the associated outside diameters of components 1, 2, 3 to ensure a defined orientation relative to the holding tool 50.

Figure 4:
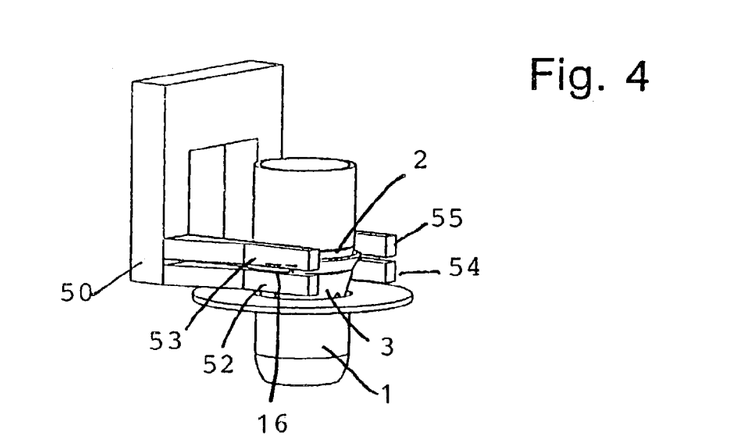

According to FIG. 4, the two upper jaws 53, 55 are moved downward in such a way that the holding element 16 is clamped between the two jaws 52, 53 with a defined pressure so as to ensure proper contact with the two contact elements of welding sleeve 3. As may be seen from FIG. 2, the lower jaw 52 of the holding tool 50 has an additional contact 56 and, correspondingly, the upper jaw 53 has an additional contact 57. These contacts 56, 57 are connected with the welding device via electric lines (not shown). Alternatively, one of the jaws 54, 55 (shown on the rear side in the drawing) can be provided with a corresponding contact to establish the electrical connection with an end or a contact of the heating element on an additional holding element that is provided there.

Figure 5:
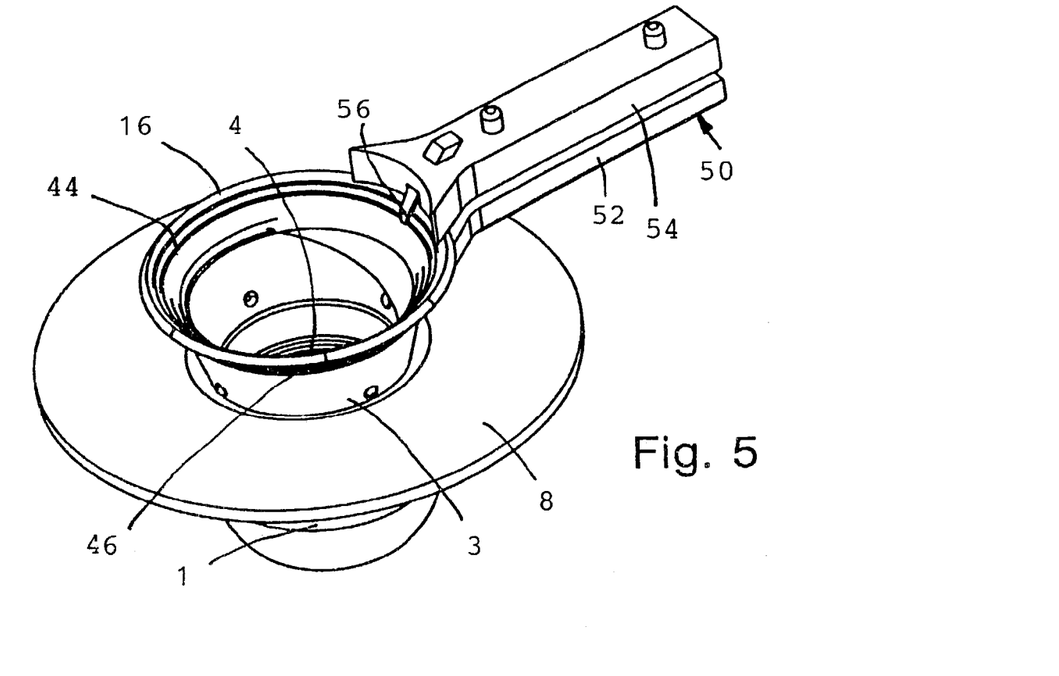
FIGS. 5–8 are representations of a further embodiment according to FIG. 4 during different process steps for producing the connection with a clamp-like holding tool.

FIG. 5 shows a further embodiment similar to FIG. 1, but the pipe with the second component is not shown. The welding sleeve 3 is inserted into the tank opening of tank 8 (only partially shown) by the clamp-like holding tool 50. Holding tool 50 comprises the two jaws 52, 54, which can be moved relative to one another to grasp and hold the holding element 16, which is configured as an annular flange. The inner contact 44 or the inner wire end of heating element 4 can be seen on the inner surface of holding element 16. This inner contact 44 is configured as a circumferentially closed loop with which the additional contact 56 of holding tool 50 engages to establish a reliable contact. The additional contact 56 preferably fits against the inner contact 44 under a predefined tension, which is produced, in particular, by a spring or the like (not shown).

It should be noted that on the outer surface of the holding element 16, the wire end is arranged likewise with at least one loop extending over the entire circumference, so that an analogously arranged contact of the lower jaw 52 fits against the outer contact 46 for secure contacting. This annular or circumferentially closed configuration of the inner and the outer contact ensures reliable contacting in every circumferential position of holding tool 50 relative to the welding sleeve 3.

Figure 6:
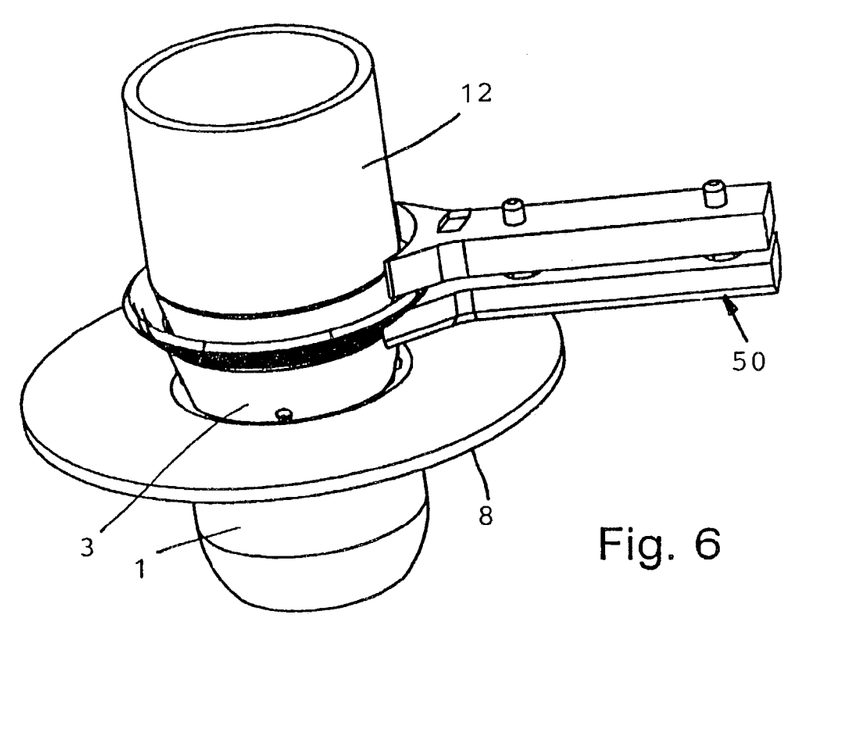

According to FIG. 6, pipe 12 with the second component is inserted into the interior of the welding sleeve 3. It should be noted that the holding tool 50 remains engaged with the contact elements of welding sleeve 3 to maintain electrical contact. By applying the welding energy supplied by a welding device (not shown) to the heating element via the aforementioned contacts, the electric weld of pipe 12 with tank 8 is produced through welding sleeve 3.

Figure 7:
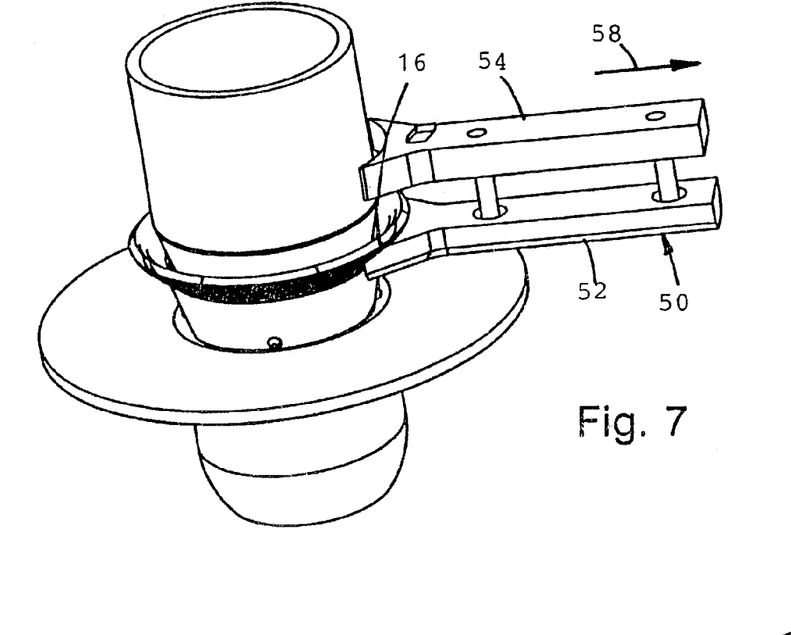

According to FIG. 7, the holding tool 50 is then disengaged from the welding sleeve 3. For this purpose, the two jaws 52, 54 are moved away from one another so that the holding element 16 is now released and the holding tool 50 can be removed in the direction of arrow 58.

Figure 8:
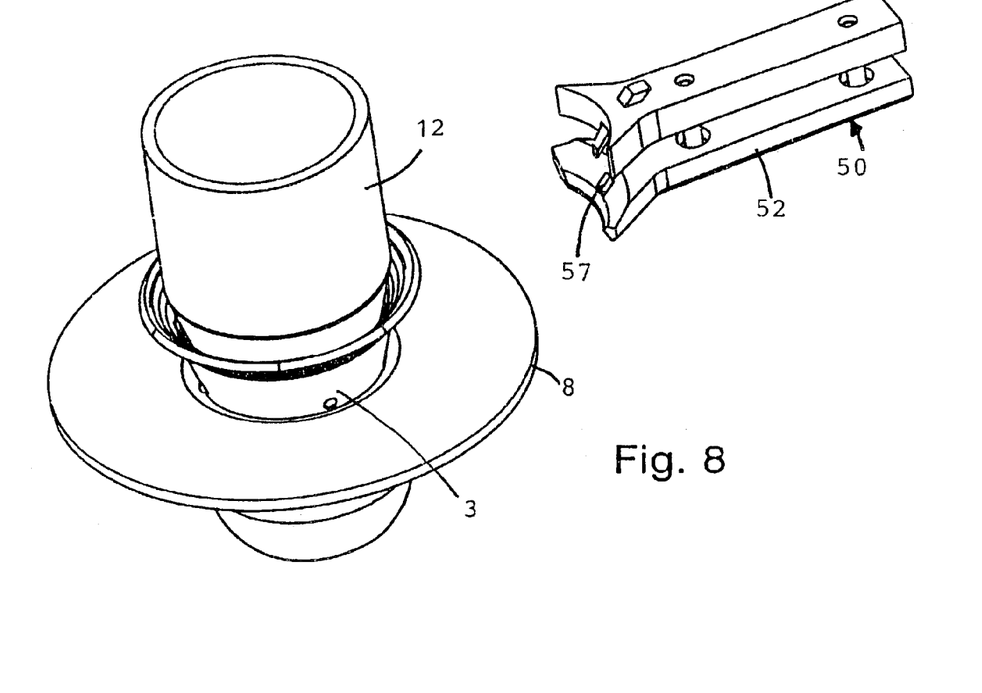

In FIG. 8, the holding tool 50 is removed and pipe 12 is now tightly connected with tank 8 by means of welding sleeve 3. The aforementioned additional contact 57 of the lower jaw 52 of the clamp-like holding tool 50 is clearly visible here.

Figure 9:
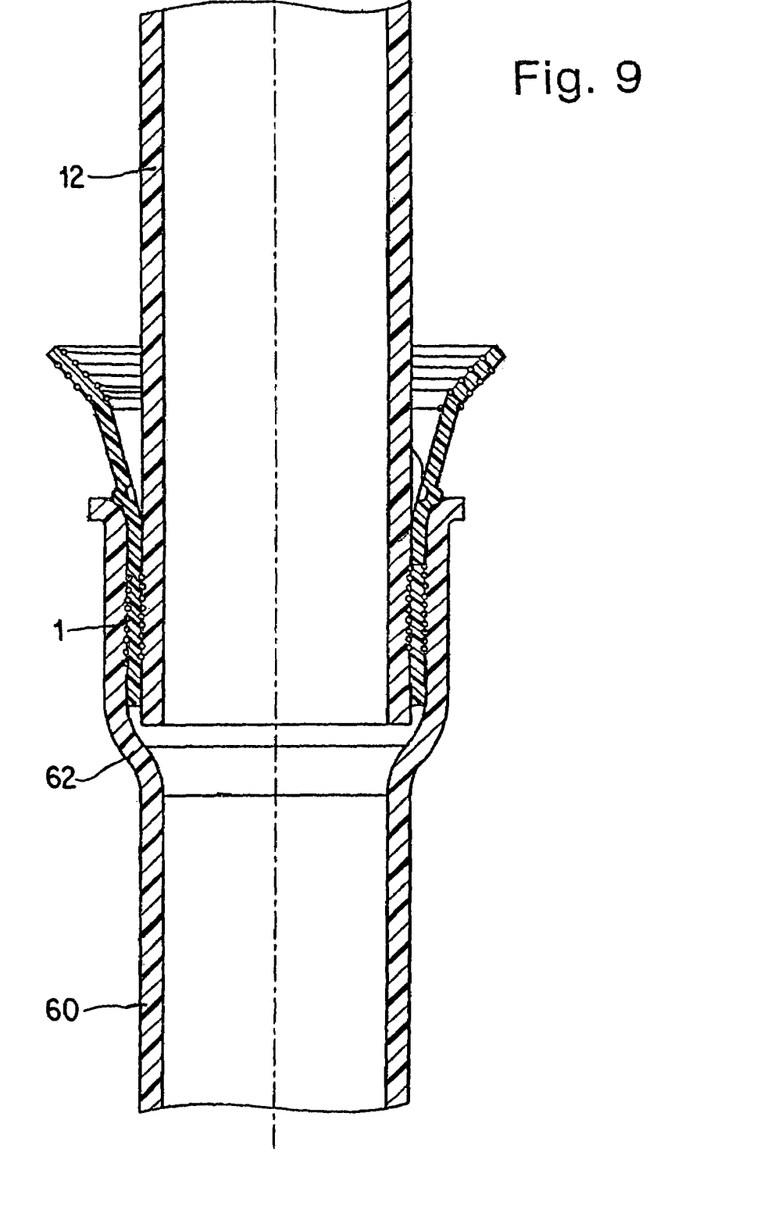
FIG. 9 is a further embodiment for connecting two pipes, particularly of a fuel line.

FIG. 9 depicts a longitudinal section of a further embodiment, in which the first component 1 is configured as a sleeve of a second pipe 60. The first pipe 12 has a constant diameter and the bottom of sleeve 62 of the first component 1 forms a limit stop defining the insertion depth of the first pipe 12. In other respects, the description provided above applies correspondingly. The two pipes 12, 60 are preferably part of a fuel line of a motor vehicle. This fuel line is further connected with a fuel tank as described above.

Figure 10:
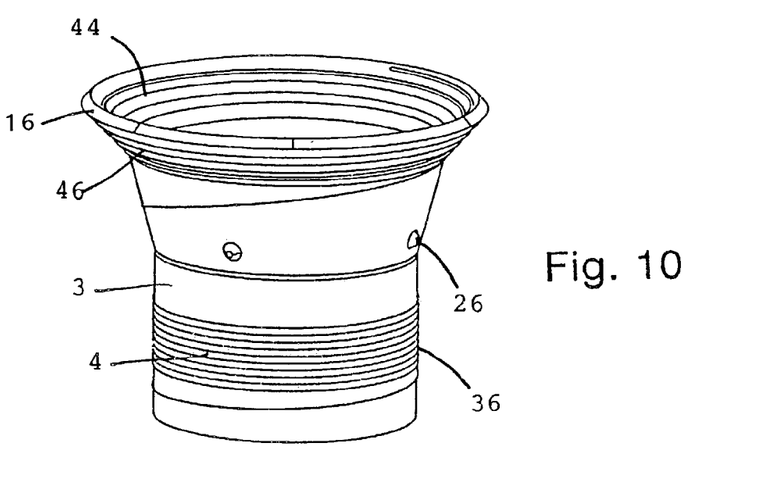
FIG. 10 is a perspective view of the component provided with the heating element of FIG. 9.

FIG. 10 shows the inventive welding sleeve 3 with outer heating coil 36 and outer contact 46 of the holding element 16. The inner contact 44 is also clearly visible. Contacts 44 and 46 comprise a plurality of circumferentially closed turns to ensure functionally reliable contacting in any position of the holding tool. The configuration of limit stops 26 as radially outwardly pointing projections is also clearly visible. It should be noted that the heating element 4 configured in this manner advantageously consists of a single continuous wire, which is arranged in the manner shown and described on the inner surface and on the outer surface of the additional component 3.

Figure 11:
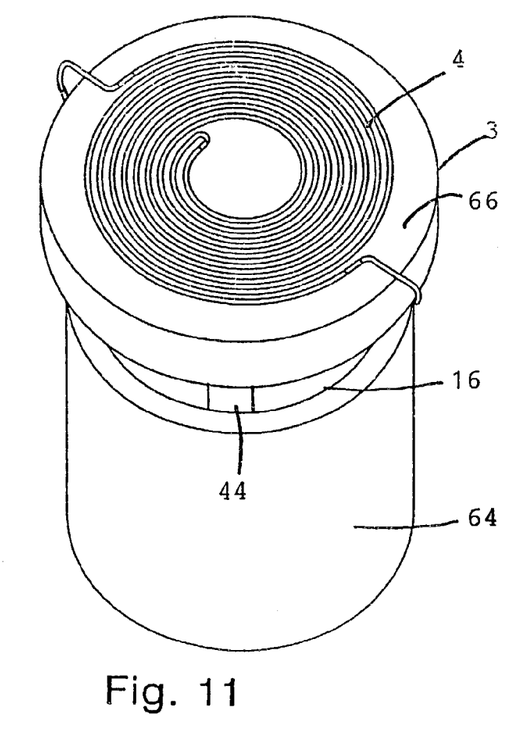
FIG. 11 is a further embodiment of a component which comprises the heating element in the area of an end face and which is used to position additional devices.

FIG. 11 shows a special embodiment of the additional component 3, which is used to position additional devices, e.g., fuel pump, hose holder, sensor, or similar items, in or on a first component, particularly a fuel tank. The additional component 3 is part of a positioning body 64. The flange-like holding element 16 is also provided. The additional component 3 on one end face 66 carries the heating element 4, which is configured as a bifilar winding made of an electrically conductive heating wire or resistance wire. The end face 66 has a predefined contour that matches the associated contour of the first component or tank or the like. The surface contour of end face 66 can be flat, as shown, or convex or concave, or configured in some other manner to correspond with the surface contour of the first component on which the positioning body 64 is to be attached and positioned. The one end of the wire is guided to the contact 44 of holding element 16.

Figure 12:
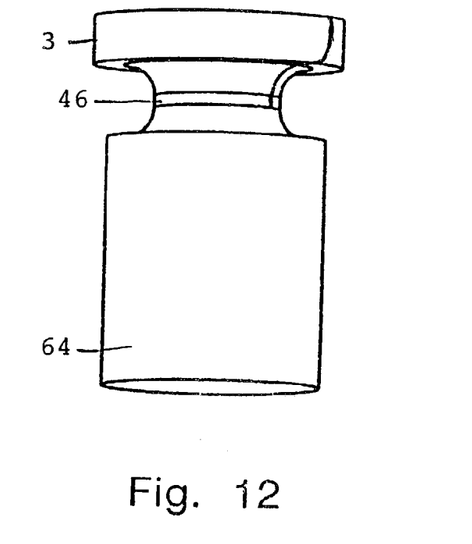
FIG. 12 is a side view of the component of FIG. 11.

FIG. 12 is a side view of component 3 in which the other contact 46 is clearly visible in a constriction below component 3.

Figure 13:
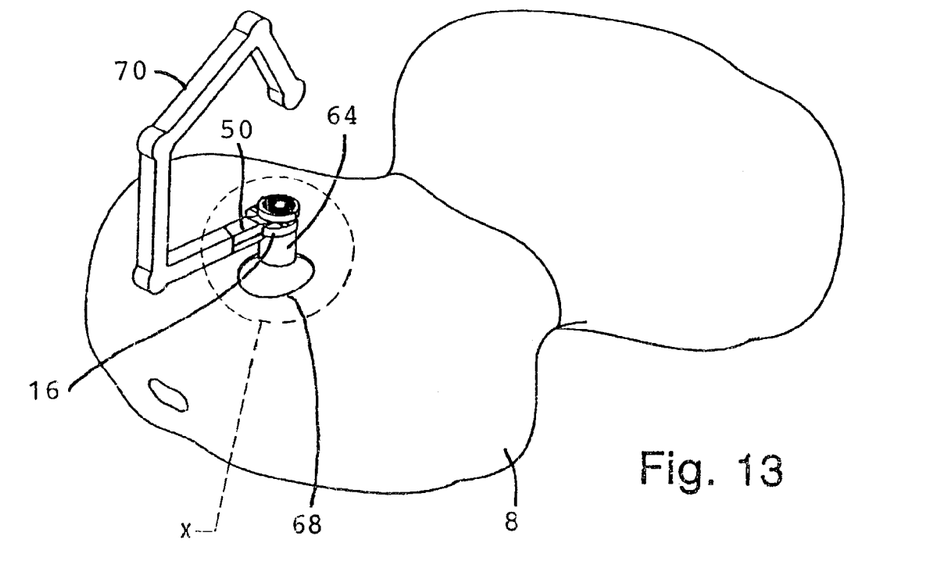
FIGS. 13–16 are schematic representations for positioning the component of FIG. 11 in the interior of a tank.

FIG. 13 schematically shows the positioning body 64 together with a tank 8 whose outer contour is defined by the installation conditions in a motor vehicle. The tank 8 comprises a tank opening 68 through which the positioning body 64 can be inserted into the interior of the tank and placed at the desired position on the inner tank wall by a tool or handling device 70, which is not further described here. It should be noted that only after positioning the positioning body 64 on, and producing the welded joint with, the inner tank wall in the manner described above, the tank line or its pipe end is connected with tank 8 in the area of tank opening 68. The tool or handling device 70 comprises the clamp-like holding tool 50, which engages with flange 16 and thus securely holds the positioning body 64.

Figure 14:
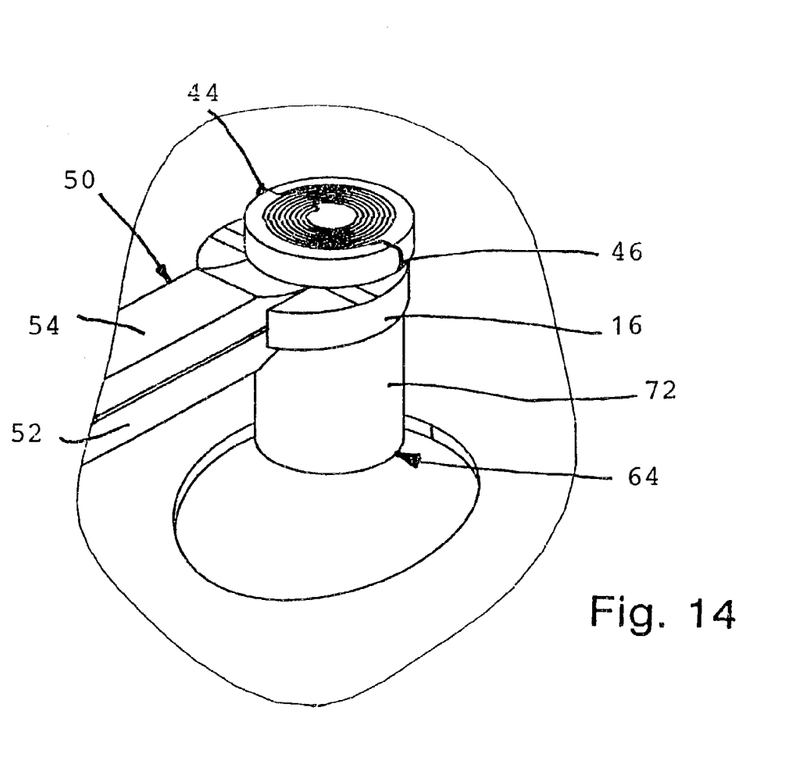

FIG. 14 is an enlarged detail X according to FIG. 13, in which holding tool 50 holds flange 16 between its two jaws 52, 54. The two ends 44, 46 of the heating element 4 extend to the holding element or flange 16 where they form the contacts, or are electrically connected with the contacts provided there, particularly by spot welding.

Alternatively, the contacts or wire ends can be guided to the outer surface 72 of the positioning body 64, in which case outer surface 72 forms the holding element for the holding tool. In this type of an embodiment, the clamp-like jaws of the holding tool are rotated by 90° compared to FIG. 14 and can be moved in radial direction relative to the positioning body 64 and placed radially onto the outer surface 72 and pressed onto this outer surface with a defined pressure to hold the positioning body 64 and to ensure the required contacting pressure of the additional contact elements.

Figure 15:
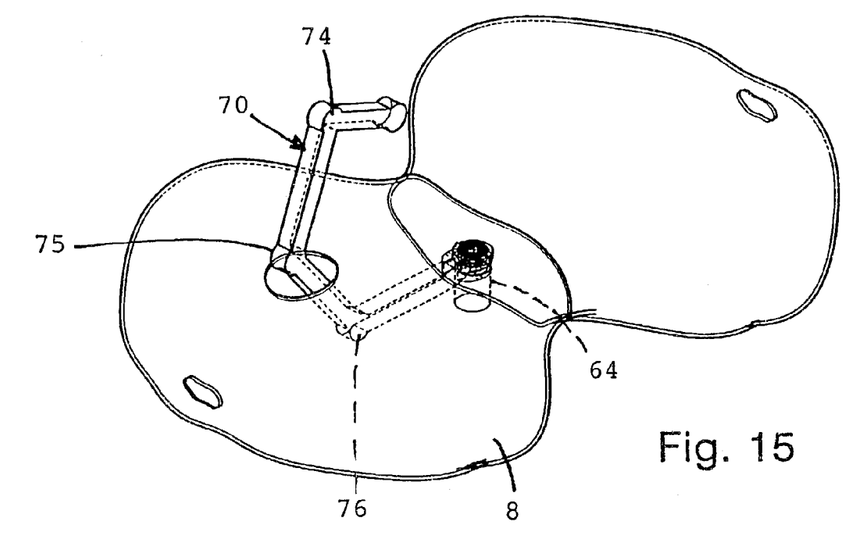
Figure 16:
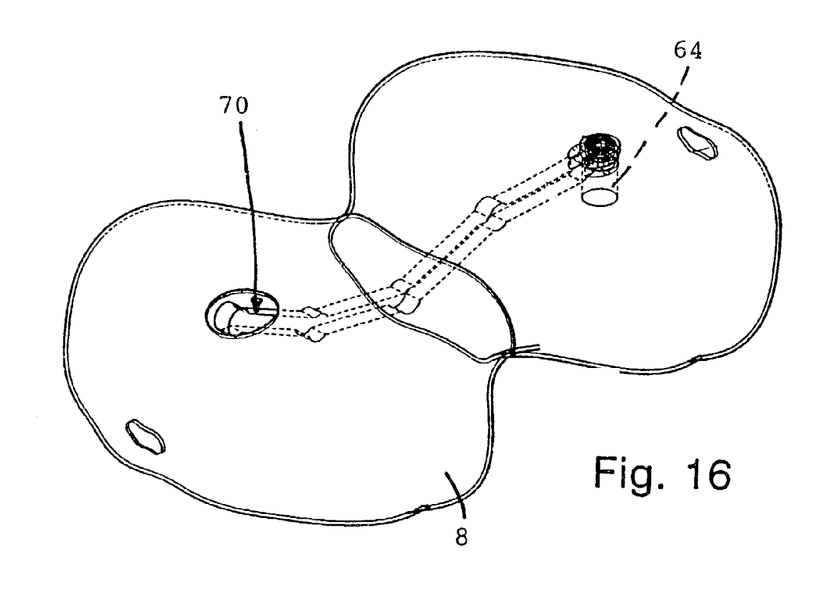

According to FIG. 15, tool 70, which has several knuckle joints 74 to 76, is partially inserted into the interior of tank 8. According to FIG. 16, tool 70 is inserted still further into the interior of tank 8, such that the positioning body 64 is located at the desired position in the interior of the tank. By means of tool 70, the end face of the additional component of positioning body 64 is pressed against the inner wall of the tank. It should be noted that tool 70 is provided with electric lines that ensure the electric connection between the heating element of positioning body 64 and the welding device. After applying the welding energy required to produce the weld while maintaining a predefined contact pressure by means of the tool or handling device 70, a secure connection is produced between the positioning body 64 and the inner wall of tank 18.

Figure 17:
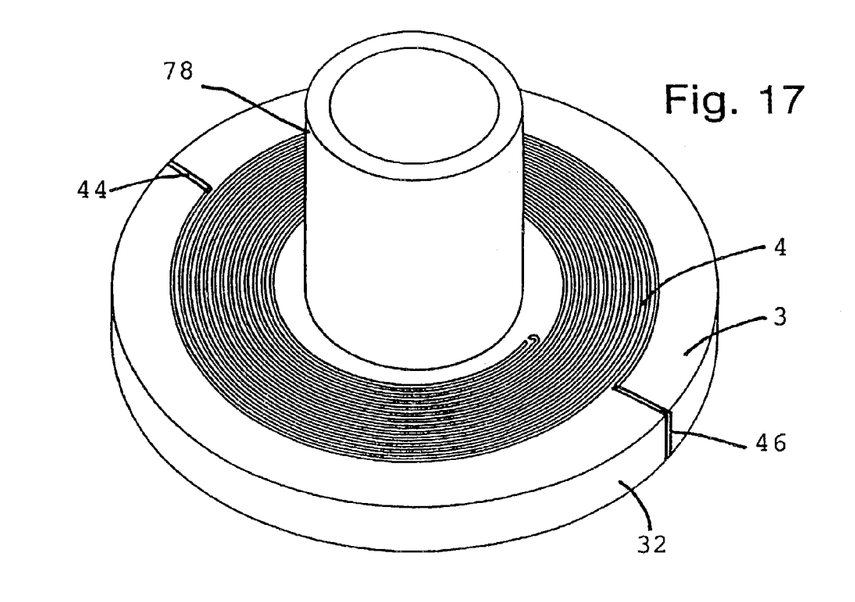
FIG. 17 is a further embodiment of the component with a heating element arranged on an annular surface.
Figure 18:
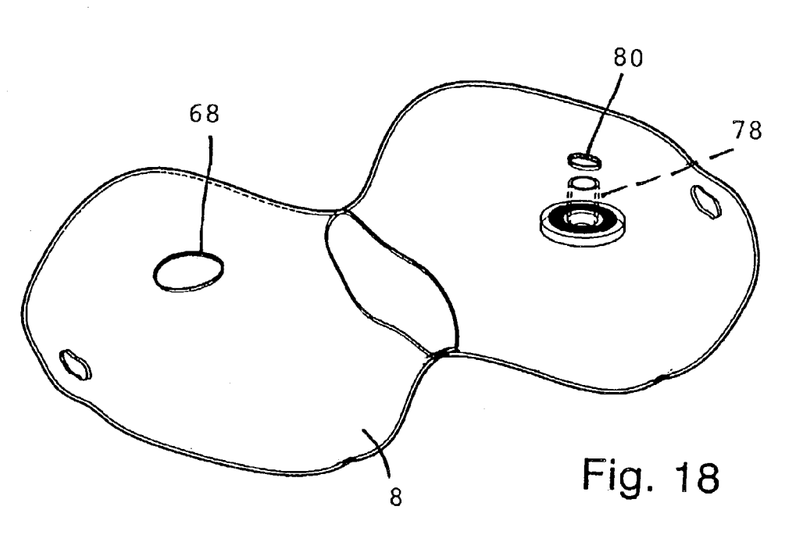
FIG. 18 is a schematic representation of the component of FIG. 17 inside a fuel tank.

FIGS. 17 and 18 show a further embodiment in which the additional component 3 is provided with an annular heating element 4 in the form of a bifilar winding on an axial end face 66. As explained above, the contour of this end face is adapted to the surface contour of the first component to be connected, particularly the inner wall of the fuel tank. A fitting 78, which is configured as a tank outlet, e.g., for ventilating the tank, is connected with the additional component 3. The contacts and/or ends 44, 46 of heating element 4 lead, as shown, to the outer surface of the flangelike additional component 3. The holding tool or its clamp-like jaws are pressed against the outer surface 32 in radial direction relative to the longitudinal axis of fitting 78 to hold it and to produce the contact pressure necessary to make the welded joint. Alternatively, a flange-like holding element as described above with reference to FIG. 11 may be provided below, i.e., behind the drawing plane.

According to FIG. 18, the tank has an opening 80 through which the aforementioned fitting 78 reaches toward the exterior once the additional component 3 has been correspondingly positioned. Prior to that, the additional component 3 was inserted through the first tank opening 68 into the interior of tank 8, as described above, by means of a tool or handling device (not shown), was positioned underneath the second tank opening 80 and finally moved in the direction of the inner tank wall in such a way that the fitting 78 was reaching through the second tank opening 80 toward the exterior. For the welding operation, the additional component 3 is pressed against the inner wall of tank 8 by the handling device so that the heating element 4 makes contact at a predefined contact pressure and upon delivery of the welding energy a tight and durable joint is produced.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A device for connecting components made of fusible plastic, the components including a first component comprising a fuel tank, said fuel tank having a tank opening configured as an inwardly directed annular sleeve protruding into the interior of the tank, a second component comprising an end of a plastic fuel line inserted into the inwardly protruding sleeve of the first component with an annular gap between the first and second components, and a welding sleeve disposed in the annular gap between the first and second components, said device comprising:
   a heating element having ends through which electrical energy can be supplied; and
   a holding element for engaging a holding tool, wherein
      the heating element and the holding element are part of the welding sleeve and the heating element is arranged on inner and outer surfaces of the welding sleeve,
      the ends of the heating element are disposed on the holding element and engage contacts on the holding tool when the holding tool is applied to the holding element, and
      the welding sleeve includes an insertion depth limit stop on the outer surface of the welding sleeve, wherein said insertion depth limit stop is a radially-outward projecting ridge formed over at least two portions of a circumference of the welding sleeve.

2. A device according to claim 1, wherein the ends of the heating element are arranged opposite one another.

3. A device according to claim 1, wherein the ends of the heating element have a planar configuration.

4. A device according to claim 1, wherein the ends of the heating element form planar electrical contacts on the holding element.

5. A device according to claim 4, wherein the holding element is flange-shaped or is formed with a segmented top edge, and the contacts on the holding element are arranged on opposite surfaces thereof.

6. A device according to claim 1, wherein the holding element is configured to receive a holding tool which comprises a clamp.

7. A device according to claim 1, wherein the holding element is configured to receive a holding tool which has two jaws that can be moved relative to one another, between which the holding element can be clamped.

8. A device according to claim 7, wherein the holding element is configured to receive an electrical connection via holding tool jaws to a welding apparatus.

9. A device according to claim 1, wherein said heating element comprises at least one of a metal grid, metal threads, metal particles, metal wires, and a coating or conductor made of electrically conductive polymeric material, and welding energy applied to the heating element is selected from the group consisting of an electric current flow, electrical induction, and application of microwaves.

10. A device according to claim 1, wherein the heating element comprises an electric heating coil.

11. A device according to claim 1, wherein when the welding sleeve is partly received in one of said first or second plastic components to be connected, the holding element extends out of said one component and opens out at least partially conically in a radially outward direction.

12. An assembly of fused components made of fusible plastic, comprising:
   a first fusible plastic component comprising a fuel tank, said fuel tank having a tank opening configured as an inwardly directed annular sleeve protruding into the interior of the tank;
   a second fusible plastic component comprising an end of a plastic fuel line disposed in the inwardly protruding sleeve of the first component such that there is an annular gap between the first and second components; and
   a welding sleeve disposed in the annular gap between the first and second components, said welding sleeve having a heating element arranged on inner and outer surfaces thereof and disposed between the first fusible plastic component and the second fusible plastic component,
   wherein
      the welding sleeve includes an insertion depth limit stop on an outer surface of the welding sleeve, said insertion depth limit stop is a radially-outward projecting ridge formed over at least two portions of a circumference of the welding sleeve, and
      an inner surface of the first component is fused to the outer surface of the welding sleeve in a vicinity of an outer surface portion of the heating element, and an outer surface of the second component is fused to the inner surface of the welding sleeve in a vicinity of an inner surface portion of the heating element.

13. An assembly according to claim 12, wherein the components are a fuel line and a fuel tank of a motor vehicle.

* * * * *